US012685621B2

(12) United States Patent
Ahn et al.

(10) Patent No.: US 12,685,621 B2
(45) Date of Patent: Jul. 21, 2026

(54) AUTOMATED METHOD FOR GENERATING PROTHESIS FROM THREE DIMENSIONAL SCAN DATA, GENERATOR GENERATING PROSTHESIS FROM THREE DIMENSIONAL SCAN DATA AND COMPUTER READABLE MEDIUM HAVING PROGRAM FOR PERFORMING THE METHOD

(71) Applicant: IMAGOWORKS INC., Seoul (KR)

(72) Inventors: Junseong Ahn, Seoul (KR); Jinhyeok Choi, Seoul (KR); Dong Uk Kam, Seoul (KR); Tae-geun Son, Seoul (KR); Youngjun Kim, Seoul (KR)

(73) Assignee: IMAGOWORKS INC., Seoul (KR)

( * ) Notice: Subject to any disclaimer, the term of this patent is extended or adjusted under 35 U.S.C. 154(b) by 168 days.

(21) Appl. No.: 18/384,720

(22) Filed: Oct. 27, 2023

(65) Prior Publication Data

US 2024/0156578 A1     May 16, 2024

(30) Foreign Application Priority Data

Nov. 15, 2022    (KR) ........................ 10-2022-0152907

(51) Int. Cl.
| *G06T 7/70* | (2017.01) |
| *A61C 9/00* | (2006.01) |
| *A61C 13/00* | (2006.01) |
| *G06T 7/00* | (2017.01) |
| *G06T 17/20* | (2006.01) |

(52) U.S. Cl.
CPC ........ *A61C 13/0004* (2013.01); *A61C 9/0053* (2013.01); *G06T 7/0012* (2013.01); *G06T 7/70* (2017.01); *G06T 17/205* (2013.01); *G06T 2207/20084* (2013.01); *G06T 2207/30036* (2013.01)

(58) Field of Classification Search
CPC . A61C 13/0004; A61C 9/0053; G06T 7/0012; G06T 7/70; G06T 17/205; G06T 2207/20084; G06T 2207/30036
See application file for complete search history.

(56) References Cited

U.S. PATENT DOCUMENTS

| 10,932,890 B1 * | 3/2021 | Sant ................... A61C 13/0004 |
| 11,007,040 B2 * | 5/2021 | Azernikov ............. G06N 3/094 |
| 11,291,532 B2 * | 4/2022 | Azernikov ........... G06T 7/0012 |
(Continued)

FOREIGN PATENT DOCUMENTS

| EP | 4331531 A | 3/2024 |
| KR | 20170135731 A | 12/2017 |
(Continued)

OTHER PUBLICATIONS

European Search Report issued on Mar. 25, 2024.
International Search Report issued on Aug. 7, 2023.

*Primary Examiner* — Tom Y Lu
(74) *Attorney, Agent, or Firm* — LEEPI

(57) ABSTRACT

An automated method for generating a prosthesis from a 3D scan data, the method includes extracting prep information of a prepared tooth from the 3D scan data, generating a two dimensional ("2D") projection images by projecting the 3D scan data based on the prep information and generating a 3D prosthesis based on the 2D projection images using a generative adversarial network including a 2D encoder and a 3D decoder.

18 Claims, 8 Drawing Sheets

(56)  References Cited

U.S. PATENT DOCUMENTS

| | | | |
|---|---|---|---|
| 2019/0282344 A1 | 9/2019 | Azernikov et al. | |
| 2021/0059796 A1 | 3/2021 | Weiss et al. | |
| 2021/0153986 A1 | 5/2021 | Wirjadi et al. | |
| 2023/0068727 A1* | 3/2023 | Saphier .................. | G06T 17/20 |

FOREIGN PATENT DOCUMENTS

| | | | |
|---|---|---|---|
| KR | 102331034 B1 | 12/2021 |
| KR | 20220104036 A | 7/2022 |
| KR | 102461283 B1 | 11/2022 |

* cited by examiner

FIG. 8

AUTOMATED METHOD FOR GENERATING PROTHESIS FROM THREE DIMENSIONAL SCAN DATA, GENERATOR GENERATING PROSTHESIS FROM THREE DIMENSIONAL SCAN DATA AND COMPUTER READABLE MEDIUM HAVING PROGRAM FOR PERFORMING THE METHOD

PRIORITY STATEMENT

This application claims priority under 35 U.S.C. § 119 to Korean Patent Application No. 10-2022-0152907, filed on Nov. 15, 2022 in the Korean Intellectual Property Office (KIPO) and International Patent Application No. PCT/KR2022/018637 filed on Nov. 23, 2022, the contents of which are herein incorporated by reference in their entireties.

BACKGROUND

1. Technical Field

Embodiments relate to an automated method for generating a prosthesis from a three dimensional ("3D") scan data, a generator generating the prosthesis from the 3D scan data and a non-transitory computer-readable storage medium having stored thereon program instructions of the automated method for generating the prosthesis. More particularly, embodiments relate to an automated method for generating a prosthesis from a 3D scan data reducing a time for generating the prosthesis by using a geometric deep learning, a generator generating the prosthesis from the 3D scan data and a non-transitory computer-readable storage medium having stored thereon program instructions of the automated method for generating the prosthesis.

2. Description of the Related Art

A three dimensional ("3D") oral scan data refers to a scanned data of teeth and oral cavity by a 3D scanner, or a scanned data of an impression object or a reconstructed object of the teeth and the oral cavity by the 3D scanner. In prosthetic treatment such as in-ray, on-ray, and crown, dental treatment such as implant and orthodontic treatment, oral data of the patient may be acquired and be used to design prosthesis or implant, braces.

Conventionally, a method of generating a prosthesis manually after taking a direct model of the teeth and the oral cavity using alginate or the like has been mainly used. In order to make an anatomically correct prosthesis, a dentist or a dental technician may determine a degree of wear on adjacent teeth, a tooth number and occlusion information of an antagonist tooth, and then generate the prosthesis. In the conventional prosthesis generating method, an operator may manually modify a general tooth shape according to the oral condition of each patient in consideration of the above information.

Conventionally, the prosthesis may be generated manually, work fatigue of the dentist or the dental technician may increase and accuracy and productivity of the prosthesis may decrease. In addition, the quality of the prosthesis and the time for generating the prosthesis may vary greatly depending on the proficiency of the operator.

SUMMARY

Embodiments provide an automated method for generating a prosthesis from a three dimensional ("3D") scan data reducing a time for generating the prosthesis by using a geometric deep learning.

Embodiments provide a generator generating a prosthesis from a 3D scan data.

Embodiments provide a non-transitory computer-readable storage medium having stored thereon program instructions of the automated method for generating a prosthesis from a 3D scan data.

In an example automated method for generating a prosthesis from a 3D scan data according to the present inventive concept, the method includes extracting prep information of a prepared tooth from the 3D scan data, generating a two dimensional ("2D") projection images by projecting the 3D scan data based on the prep information and generating a 3D prosthesis based on the 2D projection images using a generative adversarial network including a 2D encoder and a 3D decoder.

In an embodiment, the method further includes extracting a margin line of the prepared tooth. The prep information may be extracted using a prepared mesh data extracted using the margin line.

In an embodiment, the prep information may include a position of the prepared tooth. The position of the prepared tooth may be a center of gravity of the prepared mesh data.

In an embodiment, the prep information may include a position of the prepared tooth. The position of the prepared tooth may be a center of the margin line.

In an embodiment, the prep information may include a direction of the prepared tooth. The direction of the prepared tooth may be determined using normal vectors of surfaces of the prepared mesh data.

In an embodiment, when the direction of the prepared tooth is d, a number of the surfaces of the prepared mesh data is N, the normal vectors are $\{n_1, \ldots, n_N\}$, $x_{opt}$ is a direction in which a normal vector of a point of the prepared mesh data is not obscured and T is a transpose function switching row and column indices of a matrix, $$d = \mathrm{argmin}_{x_{opt} \in R^3} \sum_{i=1}^{N} \left(1 - x_{opt}^T n_i\right)$$

may be satisfied.

In an embodiment, the prep information may include a position of the prepared tooth and a direction of the prepared tooth. The 2D projection images may be generated using projection planes. The projection planes may be spaced apart from a predetermined distance from the position of the prepared tooth and defined such that an opposite tooth of the prepared tooth or an adjacent tooth of the prepared tooth is visible.

In an embodiment, pixel values of the 2D projection images may be defined as distances to the closest points hitting the 3D scan data when rays are emitted from the projection planes in directions of normal vectors of the projection planes.

In an embodiment, the 2D encoder may be configured to receive the 2D projection images and to output a latent vector.

In an embodiment, the 3D decoder may be configured to receive the latent vector and to generate coordinates of points forming the 3D prosthesis.

In an embodiment, the method may further include generating a prosthesis answer data used for training the generative adversarial network. The generating a prosthesis answer data may include converting a first answer data corresponding to the prepared tooth into a second answer data having fixed connections using a deformable registration.

In an embodiment, the generating a prosthesis answer data may include dividing a cube-shaped initial model into eight parts and transforming the initial model to be closer to a shape of the first answer data to generate the second answer data.

In an embodiment, the method may further include training the generative adversarial network. The training the generative adversarial network may include a first training stage in which a prosthesis answer data is inputted to a 3D encoder to generate a latent vector and the latent vector is inputted to the 3D decoder to restore the prosthesis answer data.

In an embodiment, the training the generative adversarial network may further include a second training stage in which a training 3D prosthesis is generated by a generator and whether the training 3D prosthesis is true or fake is determined by a discriminator.

In an embodiment, the generator may include the 2D encoder and the 3D decoder which is trained in the first training stage. The discriminator may include the 3D encoder in the first training stage.

In an embodiment, a loss representing a distance difference between points of an answer mesh data and points of a predicted mesh data may be used as a training objective function. A number of the points of the answer mesh data may be equal to a number of the points of the predicted mesh data. When the loss is L, the number of the points of the answer mesh data is X, the points of the answer mesh data are $$\{p_{gt}^{1}, \cdots , p_{gt}^{X}\}$$

and the points of the predicted mesh data are $$\{p_{pred}^{1}, \cdots , p_{pred}^{X}\}, L(p_{pred}, p_{gt}) = \sum_{i=1}^{X} \left\| p_{pred}^{i} - p_{gt}^{i} \right\|$$

may be satisfied.

In an embodiment, a first answer data corresponding to the prepared tooth may be converted into a second answer data having fixed connections using a deformable registration. The prosthesis answer data may be the second answer data.

In an example generator generating a prosthesis from a 3D scan data according to the present inventive concept, the generator includes a 2D encoder configured to receive 2D projection images of a prepared tooth of the 3D scan data and to output a latent vector and a 3D decoder configured to receive the latent vector and to generate coordinates of points forming a 3D prosthesis for the prepared tooth.

In an example non-transitory computer-readable storage medium having stored thereon program instructions, the program instructions is executable by at least one hardware processor to extract prep information of a prepared tooth from a three dimensional ("3D") scan data, generate a two dimensional ("2D") projection images by projecting the 3D scan data based on the prep information and generate a 3D prosthesis based on the 2D projection images using a generative adversarial network including a 2D encoder and a 3D decoder.

According to the automated method for generating the prosthesis from the 3D scan data, the prep information of the prepared tooth may be automatically extracted, the 2D projection images, which are the projection images of the 3D scan data based on the prep information, may be generated and the 3D prosthesis may be automatically generated using the generative adversarial network including the 2D encoder and the 3D decoder.

In the automated method for generating the prosthesis from the 3D scan data of the present inventive concept, instead of generating the 2D coordinates of the prosthesis and reconstructing the 3D coordinates using the 2D coordinates, the 3D coordinates of the prosthesis may be directly generated using the generative adversarial network so that the complex post-processing to reconstruct the 2D coordinates to the 3D coordinates may not be needed.

In addition, in the automated method for generating the prosthesis from the 3D scan data of the present inventive concept, the 3D coordinates of the prosthesis may be directly generated so that the automated method may be applied to an anterior region where it is difficult to reconstruct the 2D coordinates to the 3D coordinates due to lack of the occlusion information.

In this way, the prosthesis may be automatically generated from the 3D scan data, so that the time and processes of generating the prosthesis may be reduced, and the quality of the prosthesis may be enhanced.

BRIEF DESCRIPTION OF THE DRAWINGS

The above and other features and advantages of the present inventive concept will become more apparent by describing in detailed embodiments thereof with reference to the accompanying drawings, in which:

FIG. 8 is a drawing illustrating a method of training the generative adversarial network of FIG. 6.

DETAILED DESCRIPTION OF THE EMBODIMENTS

Figure 1:
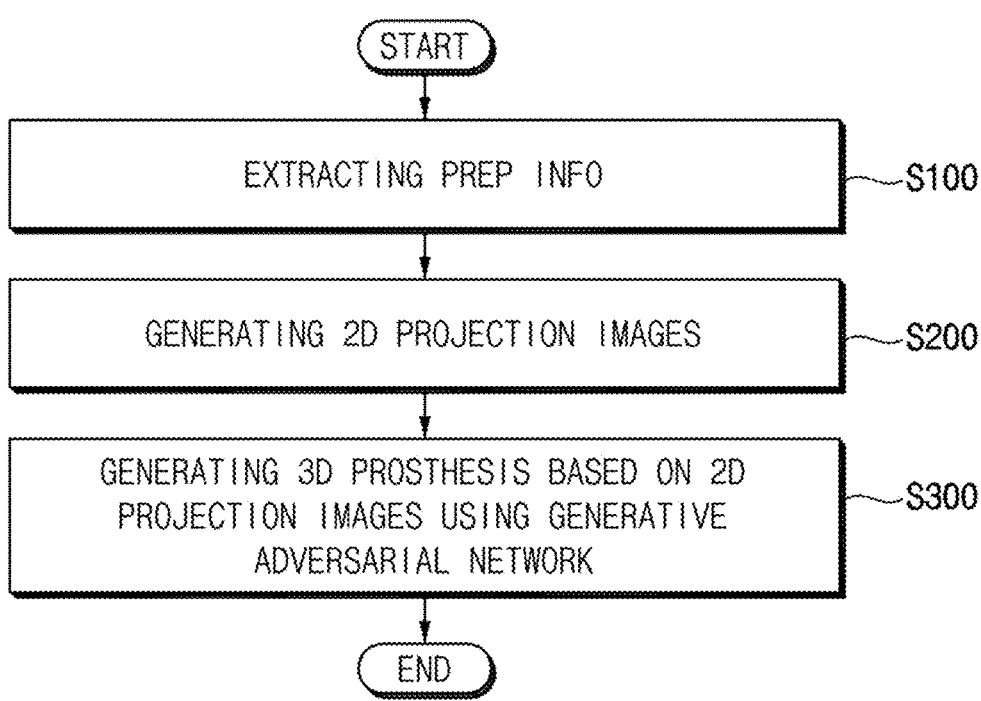
FIG. 1 is a flowchart diagram illustrating an automated method for generating a prosthesis from a three dimensional ("3D") scan data according to an embodiment of the present inventive concept.

The present inventive concept now will be described more fully hereinafter with reference to the accompanying drawings, in which embodiments of the present invention are shown. The present inventive concept may, however, be embodied in many different forms and should not be construed as limited to the embodiments set forth herein.

Rather, these embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a flowchart diagram illustrating an automated method for generating a prosthesis from a three dimensional ("3D") scan data according to an embodiment of the present inventive concept.

Referring to FIG. 1, the automated method for generating the prosthesis from the 3D scan data according to the present embodiment includes an operation (operation S100) of extracting prep information of a prepared tooth from the 3D scan data, an operation (operation S200) of generating a two dimensional ("2D") projection images by projecting the 3D scan data based on the prep information and an operation (operation S300) of generating the 3D prosthesis based on the 2D projection images using a generative adversarial network including a 2D encoder and a 3D decoder.

The automated method for generating the prosthesis from the 3D scan data according to the present embodiment may be operated by a computing apparatus.

Figure 2:
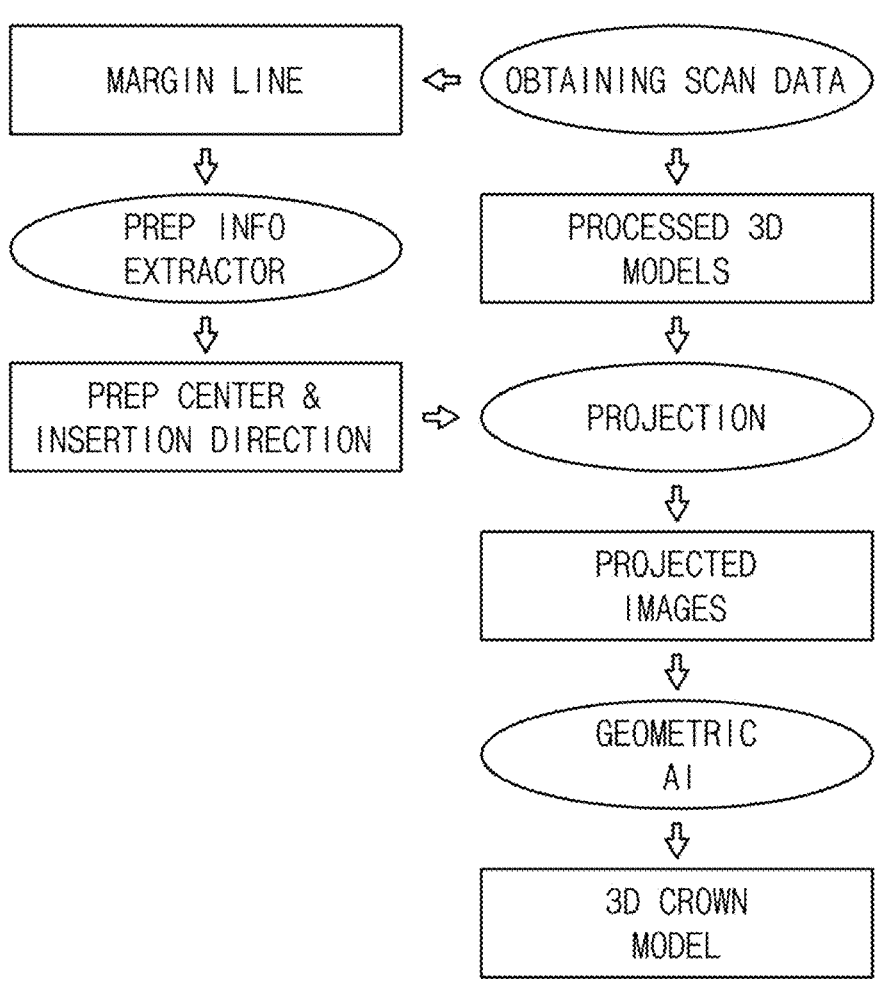
FIG. 2 is a detailed flowchart illustrating the automated method for generating the prosthesis from the 3D scan data of FIG. 1.
Figure 3:
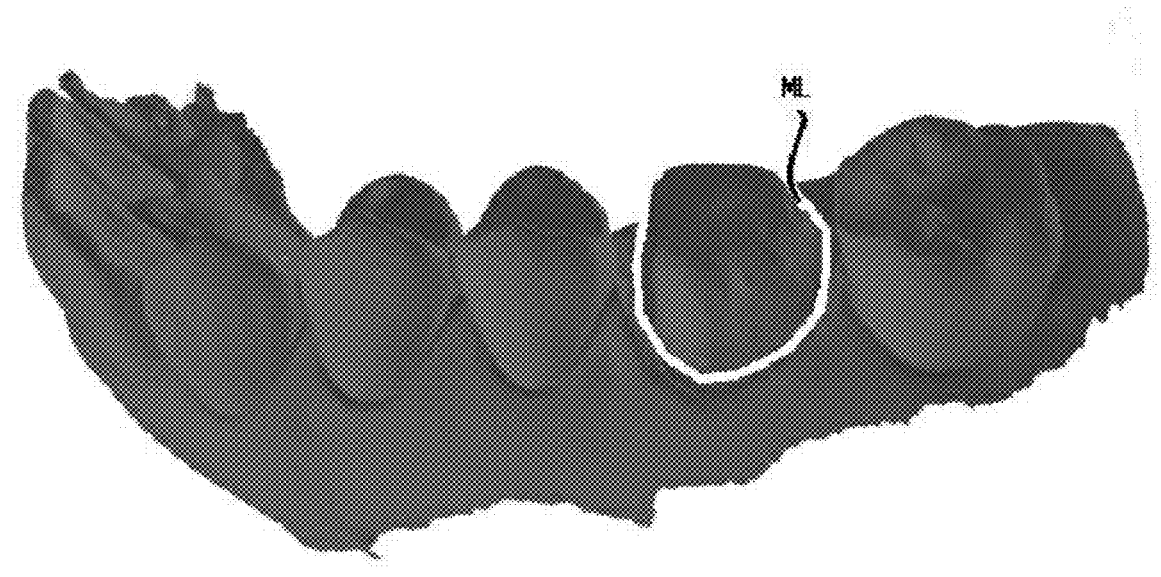
FIG. 3 is a drawing illustrating a margin line of a prepared tooth of FIG. 2.

FIG. 2 is a detailed flowchart illustrating the automated method for generating the prosthesis from the 3D scan data of FIG. 1. FIG. 3 is a drawing illustrating a margin line of a prepared tooth of FIG. 2.

Referring to FIGS. 1 to 3, the automated method for generating the prosthesis from the 3D scan data may further include extracting a margin line ML of the prepared tooth.

In order to use the present inventive concept, the 3D scan data (a 3D mesh data) of a dental arch including the prepared tooth from a 3D scanner and the margin line ML of the prepared tooth may be needed.

Herein, the 3D scan data refers to a scanned data of teeth and oral cavity by a 3D scanner, or a scanned data of an impression object or a reconstructed object of the teeth and the oral cavity by the 3D scanner. For example, the 3D scan data may be a mesh data including 3D vertices and triangles or quadrangles generated by connecting the vertices. A file extension of the 3D scan data may not be limited. For example, the file extension of the 3D scan data may be one of ply, obj and stl.

Herein, the prepared tooth may mean a tooth prepared for a crown. The prepared tooth may mean a tooth obtained by cutting a part of the tooth. To generate a single crown, an operation of shaving off a natural tooth to make it easier to place a prosthesis is needed. The natural tooth which is shaved off may be referred to the prepared tooth. The margin line ML may refer to an edge portion of the prepared tooth. The margin line ML may represent a boundary between the prepared tooth and a gum.

In FIG. 3, the margin line ML of the prepared tooth is illustrated. For example, the margin line ML may be automatically extracted from the 3D scan data. For example, the margin line MLs may be automatically extracted from the 3D scan data using an artificial intelligence neural network.

For example, the operation of automatically extracting the margin line ML may include an operation of extracting a partial scan data corresponding to the prepared tooth from the 3D scan data, an operation of mapping the partial scan data into a predetermined 2D space using a transformation matrix T, an operation of obtaining a 2D margin line by determining a curvature value from data mapped into the 2D space and an operation of converting the 2D margin line into a 3D margin line using an inverse matrix of the transformation matrix.

For example, the curvature value may be one of a maximum curvature value, a minimum curvature value, a Gaussian curvature value and an average curvature value.

In an upper surface of the tooth, the curvature value may have a relatively constant value. On the other hand, the curvature value may greatly change at a boundary between teeth or a boundary between teeth and gums. Accordingly, the margin line of the tooth may be determined using the curvature value.

Figure 4:
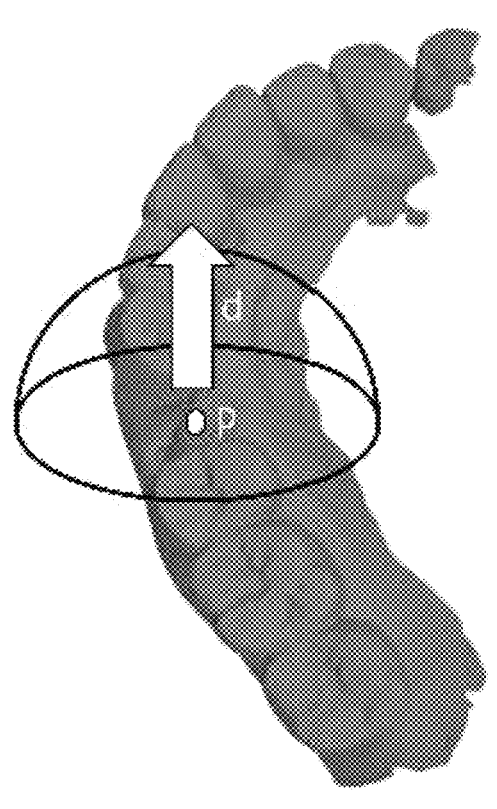
FIG. 4 is a drawing illustrating an operation of extracting prep information of the prepared tooth of FIG. 1.

FIG. 4 is a drawing illustrating an operation (operation S100) of extracting prep information of the prepared tooth of FIG. 1.

Referring to FIGS. 1 to 4, in order to use the 3D scan data as an input of a deep learning model, an operation (Prep Info Extractor) of extracting the prep information of the prepared tooth from the 3D scan data may be necessary.

For example, in the operation (operation S100) of extracting the prep information, the prep information may be extracted using a prepared mesh data extracted using the margin line ML.

For example, the prep information may include a position p of the prepared tooth and a direction d of the prepared tooth. For example, the position p of the prepared tooth may be a center of gravity (Prep center) of the prepared mesh data.

For example, when the position of the prepared tooth is p, a number of vertices of the prepared mesh data is K, the vertices are $$\{q_1, \ldots, q_k\}, \; p = \frac{1}{K} \sum_{i=1}^{K} q_i$$

may be satisfied.

Alternatively, the position p of the prepared tooth is a center of the margin line ML.

The direction d of the prepared tooth may be determined using normal vectors of surfaces of the prepared mesh data. The direction d of the prepared tooth may represent a protruded direction of the prepared tooth. The direction d of the prepared tooth may represent a direction (Insertion Direction) in which the prosthesis model is inserted into the prepared tooth.

For example, when the direction of the prepared tooth is d, a number of surfaces of the prepared mesh data is N, the normal vectors are $\{n_1, \ldots, n_N\}$, $x_{opt}$ is a direction in which a normal vector of a point of the prepared mesh data is not obscured and T is a transpose function switching row and column indices of a matrix, $$d = \mathrm{argmin}_{x_{opt} \in R^3} \sum_{i=1}^{N} \left(1 - x_{opt}^T n_i\right)$$

may be satisfied.

If the normal vector n in direction x which is not obscured is expressed in a formula, $x^T n > 0$. Herein, an angle between x and n is an acute angle. When the angle between x and n is an acute angle, $x^T n > 0$. In contrast, when the angle between x and n is an obtuse angle, $x^T n < 0$. Therefore, $x_{opt}$ may be the direction in which an average value of the angle with the normal vectors on the surfaces of the prepared mesh data is the lowest.

Figure 5:
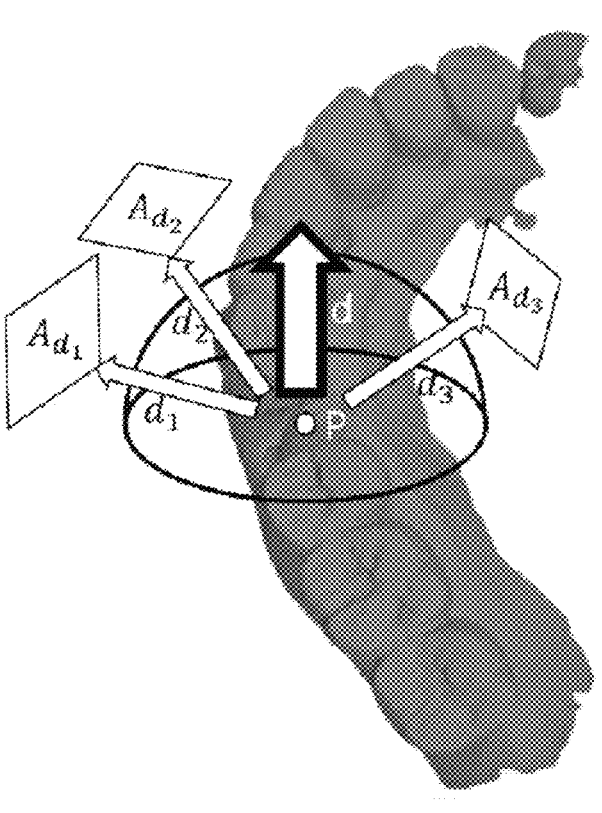
FIG. 5 is a drawing illustrating an operation of generating two dimensional ("2D") projection images of FIG. 1.

FIG. 5 is a drawing illustrating an operation (operation S200) of generating two dimensional ("2D") projection images of FIG. 1.

Referring to FIGS. 1 to 5, the 2D projection images (Projected Images) may be generated by projecting the 3D scan data based on the position p and the direction d of the prepared tooth.

The automated method for generating the prosthesis from the 3D scan data may further include aligning the 3D scan data at a origin of a predetermined coordinate system in directions of the predetermined coordinate system prior to the operation (operation S200) of generating the 2D projection images. The 3D scan data aligned in this way may be referred to "processed 3D Models".

The 2D projection images may be generated using projection planes $A_{d1}$, $A_{d2}$ and $A_{d3}$. The projection planes $A_{d1}$, $A_{d2}$ and $A_{d3}$ may be spaced apart from a predetermined distance from the position p of the prepared tooth and may be defined such that an opposite tooth of the prepared tooth or an adjacent tooth of the prepared tooth is visible.

For example, when the 3D scan data includes only one of a maxilla data and a mandible data, the 2D projection images may be defined such that the adjacent tooth of the prepared tooth is visible.

For example, when the 3D scan data includes a maxilla data and a mandible data as a pair, the 2D projection images may be defined such that the opposite tooth of the prepared tooth and the adjacent tooth of the prepared tooth are visible.

Pixel values of the 2D projection images may be defined as distances to the closest points hitting the 3D scan data when rays are emitted from the projection planes $A_{d1}$, $A_{d2}$ and $A_{d3}$ in the directions of the normal vectors d1, d2 and d3 of the projection planes $A_{d1}$, $A_{d2}$ and $A_{d3}$. Alternatively, the pixel values of the 2D projection images may be defined as perspective views of the 3D scan data when rays are emitted from the projection planes $A_{d1}$, $A_{d2}$ and $A_{d3}$ in the direction of the normal vectors d1, d2 and d3 of the projection planes $A_{d1}$, $A_{d2}$ and $A_{d3}$.

Although the number of the 2D projection images is three in FIG. 5, the present inventive concept may not be limited thereto.

Figure 6:
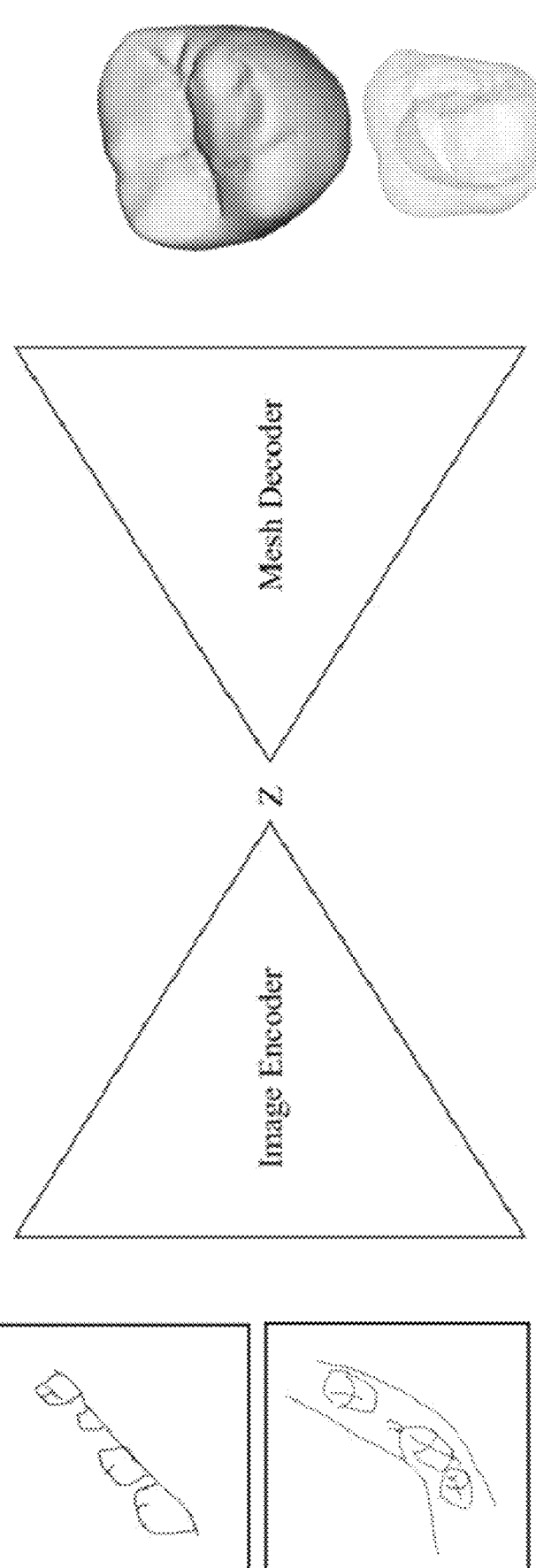
FIG. 6 is a drawing illustrating a generative adversarial network used in an operation of generating a 3D prosthesis model FIG. 1.

FIG. 6 is a drawing illustrating a generative adversarial network used in an operation (operation S300) of generating a 3D prosthesis model FIG. 1.

Referring to FIGS. 1 to 6, the generative adversarial network may be referred to a geometric AI.

Inputs of the geometric AI may be the 2D projection images, and an output of the geometric AI may be a 3D prosthesis model. Herein, the 3D prosthesis model may be a 3D single crown model (3D Crown Model).

The generative adversarial network may include a 2D encoder (Image Encoder) and a 3D decoder (Mesh Decoder). The 2D encoder may receive the 2D projection images and may output a latent vector. The 3D decoder may receive the latent vector and may generate coordinates of points forming the 3D prosthesis.

For example, the 2D encoder may receive M projection image data ($I \in R^{M \times H \times W}$) having a size of H×W as the inputs and may provide the encoded latent vector as the output.

For example, the 3D decoder may receive the latent vector generated by the 2D encoder as the input and may generate the 3D output corresponding to a final crown model.

In the present inventive concept, the data with fixed connections are trained so that the 3D output may only predict the position of each point of the mesh. To predict the position of each point of the mesh, an operation applied to an unstructured data may be used instead of a 2D convolution operation for a structured data. For example, the 3D decoder may utilize graph convolution operations such as GCN, ChebConv, GraphConv, PointNetConv, DynamicEdgeConv and SpiralConv.

As shown in FIG. 5, the 3D crown mesh may be generated using the 2D projection images. The geometric AI may generate the 3D crown mesh by combining the 2D projection images obtained from plural directions. The generative advertising network may include the image decoder that understanding the 2D image information and the mesh decoder reinterpreting the information understood in 2D to 3D.

Figure 7:
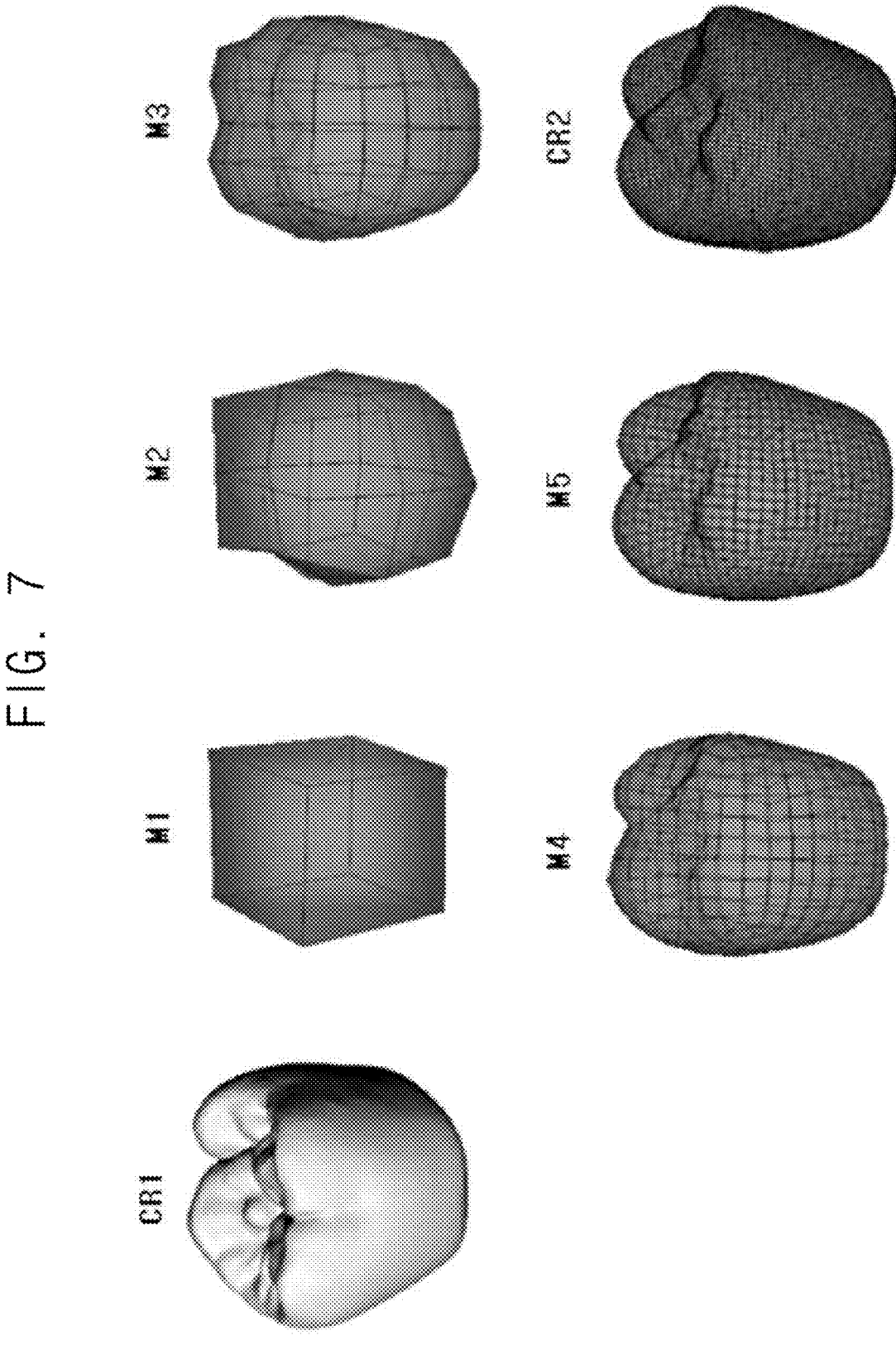
FIG. 7 is a drawing illustrating a method of generating answer data used for training of the generative adversarial network of FIG. 6.

FIG. 7 is a drawing illustrating a method of generating answer data used for training of the generative adversarial network of FIG. 6.

Referring to FIGS. 1 to 7, the automated method for generating the prosthesis from the 3D scan data may further include generating a prosthesis answer data used for training the generative adversarial network. In the operation of generating the prosthesis answer data, a first answer data CR1 corresponding to the prepared tooth may be converted into a second answer data CR2 having fixed connections using a deformable registration.

For example, in the operation of generating the prosthesis answer data, the second answer data CR2 may be generated by repetitively dividing a cube-shaped initial model M1 into eight same parts and transforming the initial model M1 to be closer to a shape of the first answer data CR1.

Specifically, training the geometric AI may be necessary to generate the 3D crown model proposed in the present inventive concept. For training the geometric AI, the 3D scan data including the prepared tooth and actual crown mesh data CR1 which are generated by dental technicians and corresponding to the prepared tooth may be needed. However, teeth shapes and positions of feature points are different for each patient and formats of scanned data are not constant so that it may be not proper to use the crown mesh data CR1 generated by the dental technicians for training the geometric AI.

As a solution to this, a method of deformable registration of the crown mesh data CR1 generated by dental technicians to a polygon mesh (e.g. a tooth library) representing a shape of a typical tooth, a cubic initial model or a spherical initial model may be used. Deformable registration may refer to a method of matching a source mesh having unspecified properties (connection relationships) to the connection relationships of an already defined target mesh.

The crown mesh data CR1 generated by different dental technicians have different properties (connection relationships). When the deformable registration is used, the properties of the crown mesh data CR1 generated by different dental technicians may become the same.

As shown in FIG. 6, as a method of the deformable registration, a mesh shrink wrapping method may be used. In the mesh shrink wrapping method, a mesh having a target shape CR1 may be generated by dividing a quad mesh of a cube through several steps. The crown mesh data CR2 with the same properties may be used as the answer data for training the geometric AI.

For example, by applying a step by step algorithm to the cubic initial mesh M1 through the mesh shrink wrapping method of FIG. 6, intermediate data such as M2, M3, M4 and M5 may be generated. Finally, the second answer data CR2 may be generated, which has the same form as the first answer data CR1 and has the fixed connections.

Figure 8:
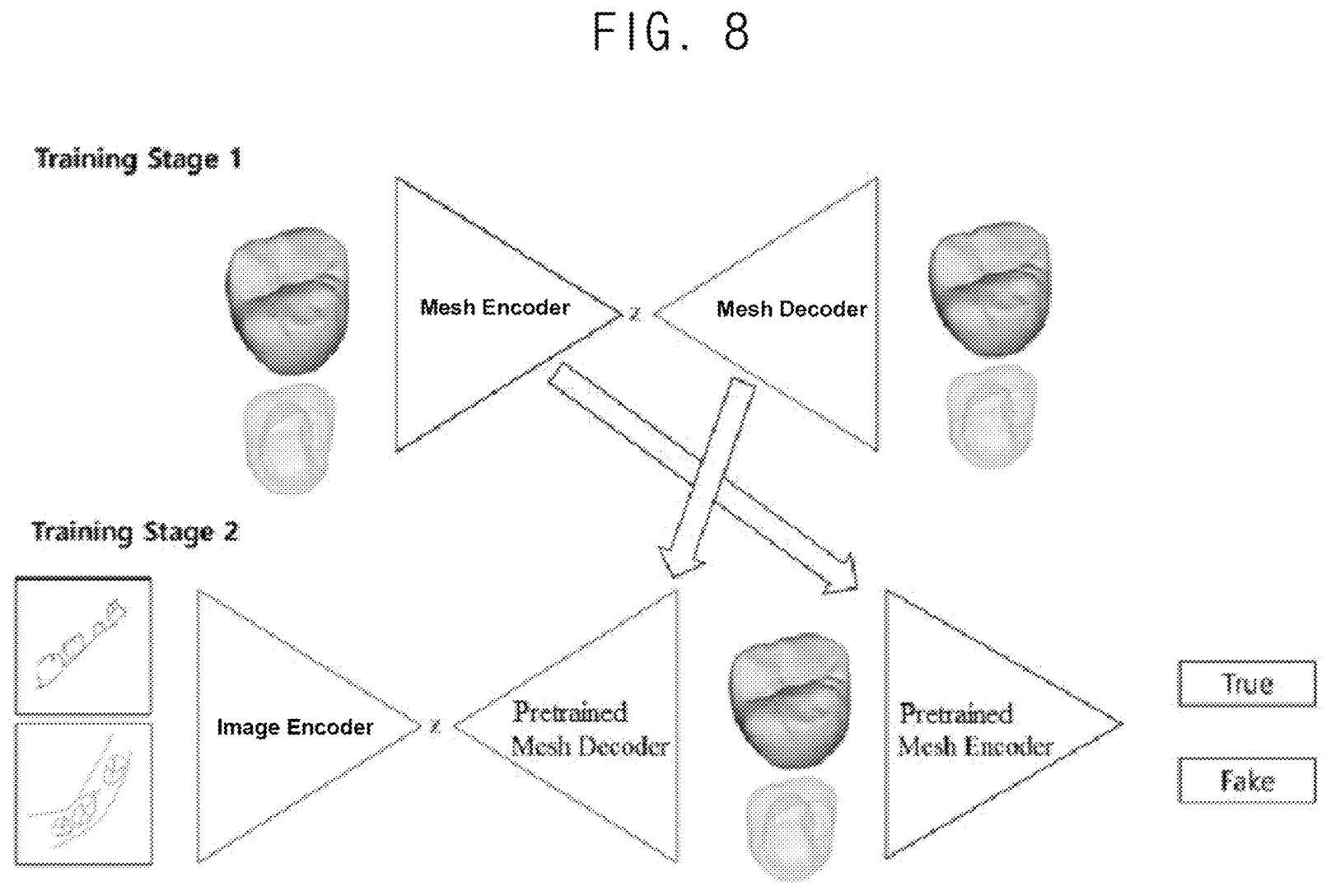

FIG. 8 is a drawing illustrating a method of training the generative adversarial network of FIG. 6.

Referring to FIGS. 1 to 8, the automated method for generating the prosthesis from the 3D scan data may further include training the generative adversarial network.

The operation of training the generative adversarial network may include a first training stage (Training Stage 1) in which the prosthesis answer data (e.g. CR2 in FIG. 7) is inputted to the 3D encoder (Mesh Encoder) to generate a latent vector Z and the latent vector Z is inputted to the 3D decoder (Mesh Decoder) to restore the prosthesis answer data (e.g. CR2 in FIG. 7). Herein, the prosthesis answer data may be the second answer data CR2.

For example, the operation of training the generative adversarial network may further include a second training stage (Training Stage 2) in which a training 3D prosthesis is generated by a generator and whether the training 3D prosthesis is true or fake is determined by a discriminator.

For example, the generator may include the 2D encoder (Image Encoder) and the 3D decoder (Pretrained Mesh Decoder) trained in the first training stage (Training Stage 1). For example, the discriminator may include the 3D encoder (Pretrained Mesh Encoder) trained in the first training stage (Training Stage 1).

In the operation of training the generative adversarial network, a loss representing a distance difference between points of an answer mesh data and points of a predicted mesh data may be used as a training objective function. A number of the points of the answer mesh data may be equal to a number of the points of the predicted mesh data. When the loss is L, the number of the points of the answer mesh data is X, the points of the answer mesh data are $$\{p_{gt}^1, \cdots, p_{gt}^X\}$$

and the points of the predicted mesh data are $$\{p_{pred}^1, \cdots, p_{pred}^X\}, L(p_{pred}, p_{gt}) = \sum_{i=1}^{X} \left\| p_{pred}^i - p_{gt}^i \right\|$$

may be satisfied.

Specifically, the generative adversarial network may include two model generators and two discriminators. The generative advocacy network uses the following optimization method to generate better results.

The connection relationships of the data are fixed so that the points $$\{p_{gt}^1, \cdots, p_{gt}^X\}$$

of the answer mesh data and the points $$\{p_{pred}^1, \cdots, p_{pred}^X\}$$

of the mesh data predicted by the deep learning model may have a one-to-one correspondence. Thus, there is no need to use a highly complex loss such as chamfer loss as the training objective function. The deep learning model according to the present inventive concept may be trained using $L_1$ $L_2$ loss which is relatively simple.

The training operation may include two stages. In the first training stage (Training Stage 1), first, the mesh decoder may be trained to express the 3D prosthesis data from the latent vector Z. In this stage, a training method of an auto encoder may be used. Processes of inputting the answer data CR2 as an input to the mesh encoder, compressing the size of the answer data CR2 into the vector Z in a latent space and expanding the latent vector Z to restore the answer data CR2 may be repeated. This may allow the mesh encoder and the mesh decoder to understand the fixed connection relationships.

In the second training stage (Training Stage 2), a structure model of the generative adversarial network (GAN) may be trained. The generator may include the image encoder extracting the feature vector from the 2D image and the mesh decoder which is pretrained in the first training stage (Training Stage 1). The discriminator may include the mesh encoder which is pretrained in the first training stage (Training Stage 1). When the generator generates the 3D prosthesis data using the 2D projection images, the discriminator determines how the 3D prosthesis data is realistic and provides the determined information to the generator, so that the generator may be trained. The generator trained in this way may generate the 3D prosthesis usable through a simple post-processing without any additional complex algorithms.

According to the present embodiment, the prep information of the prepared tooth may be automatically extracted, the 2D projection images, which are the projection images of the 3D scan data based on the prep information, may be generated and the 3D prosthesis may be automatically generated using the generative adversarial network including the 2D encoder and the 3D decoder.

In the automated method for generating the prosthesis from the 3D scan data of the present inventive concept, instead of generating the 2D coordinates of the prosthesis and reconstructing the 3D coordinates using the 2D coordinates, the 3D coordinates of the prosthesis may be directly generated using the generative adversarial network so that the complex post-processing to reconstruct the 2D coordinates to the 3D coordinates may not be needed.

In addition, in the automated method for generating the prosthesis from the 3D scan data of the present inventive concept, the 3D coordinates of the prosthesis may be directly generated so that the automated method may be applied to an anterior region where it is difficult to reconstruct the 2D coordinates to the 3D coordinates due to lack of the occlusion information.

In this way, the prosthesis may be automatically generated from the 3D scan data, so that the time and processes of generating the prosthesis may be reduced, and the quality of the prosthesis may be enhanced.

According to an embodiment of the present inventive concept, a non-transitory computer-readable storage medium having stored thereon program instructions of the automated method for generating the prosthesis from the 3D scan data may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned automated method for generating the prosthesis from the 3D scan data may be implemented in a form of a computer-executed computer program or an application which are stored in a storage method.

The present inventive concept is related to the automated method for generating the prosthesis from the 3D scan data and the non-transitory computer-readable storage medium having stored thereon program instructions of the automated method for generating the prosthesis from the 3D scan data. According to the present inventive concept, the time and the effort for generating the prosthesis may be reduced and the accuracy and the productivity of the prosthesis may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. An automated method for generating a prosthesis from a three dimensional ("3D") scan data, the method comprising:

extracting prep information of a prepared tooth from the 3D scan data;

generating a two dimensional ("2D") projection images by projecting the 3D scan data based on the prep information;

generating a 3D prosthesis based on the 2D projection images using a generative adversarial network including a 2D encoder and a 3D decoder; and generating a prosthesis answer data used for training the generative adversarial network, wherein generating the prosthesis answer data comprises:

converting a first answer data corresponding to the prepared tooth into a second answer data having fixed connections using a deformable registration.

2. The method of claim 1, further comprising:

extracting a margin line of the prepared tooth, wherein the prep information is extracted using a prepared mesh data extracted using the margin line.

3. The method of claim 2, wherein the prep information includes a position of the prepared tooth, and wherein the position of the prepared tooth is a center of gravity of the prepared mesh data.

4. The method of claim 2, wherein the prep information includes a position of the prepared tooth, and wherein the position of the prepared tooth is a center of the margin line.

5. The method of claim 2, wherein the prep information includes a direction of the prepared tooth, and wherein the direction of the prepared tooth is determined using normal vectors of surfaces of the prepared mesh data.

6. The method of claim 5, wherein when the direction of the prepared tooth is d, a number of the surfaces of the prepared mesh data is N, the normal vectors are $\{n_1, \ldots, n_N\}$, $x_{opt}$ is a direction in which a normal vector of a point of the prepared mesh data is not obscured and T is a transpose function switching row and column indices of a matrix, $$d = \mathrm{argmin}_{x_{opt} \in R^3} \sum_{i=1}^{N} \left(1 - x_{opt}^T n_i\right)$$

is satisfied.

7. The method of claim 1, wherein the prep information includes a position of the prepared tooth and a direction of the prepared tooth, wherein the 2D projection images are generated using projection planes, and wherein the projection planes are spaced apart from a predetermined distance from the position of the prepared tooth and defined such that an opposite tooth of the prepared tooth or an adjacent tooth of the prepared tooth is visible.

8. The method of claim 7, wherein pixel values of the 2D projection images are defined as distances to the closest points hitting the 3D scan data when rays are emitted from the projection planes in directions of normal vectors of the projection planes.

9. The method of claim 1, wherein the 2D encoder is configured to receive the 2D projection images and to output a latent vector.

10. The method of claim 9, wherein the 3D decoder is configured to receive the latent vector and to generate coordinates of points forming the 3D prosthesis.

11. The method of claim 1, wherein generating a prosthesis answer data comprises:

dividing a cube-shaped initial model into eight parts and transforming the initial model to be closer to a shape of the first answer data to generate the second answer data.

12. The method of claim 1, further comprising:

training the generative adversarial network, wherein training the generative adversarial network comprises:

a first training stage in which the prosthesis answer data is inputted to a 3D encoder to generate a latent vector and the latent vector is inputted to the 3D decoder to restore the prosthesis answer data.

13. The method of claim 11, wherein the training the generative adversarial network further comprises:

a second training stage in which a training 3D prosthesis is generated by a generator and whether the training 3D prosthesis is true or fake is determined by a discriminator.

14. The method of claim 13, wherein the generator comprises the 2D encoder and the 3D decoder which is trained in the first training stage, and wherein the discriminator comprises the 3D encoder in the first training stage.

15. The method of claim 13, wherein a loss representing a distance difference between points of an answer mesh data and points of a predicted mesh data is used as a training objective function, wherein a number of the points of the answer mesh data is equal to a number of the points of the predicted mesh data, and wherein when the loss is L, the number of the points of the answer mesh data is X, the points of the answer mesh data are $$\{p_{gt}^1, \dots, p_{gt}^X\}$$

and the points of the predicted mesh data are $$\{p_{pred}^1, \dots, p_{pred}^X\}, \ L(p_{pred}, p_{gt}) = \sum_{i=1}^{X} \left\| p_{pred}^i - p_{gt}^i \right\|$$

is satisfied.

16. The method of claim 12, wherein the first answer data corresponding to the prepared tooth is converted into the second answer data having fixed connections using the deformable registration, and wherein the prosthesis answer data is the second answer data.

17. A computing apparatus for generating a prosthesis from a three dimensional ("3D") scan data, the computing apparatus comprising:

at least one hardware processor; and a non-transitory computer-readable storage medium storing program instructions that, when executed by the at least one hardware processor, cause the computing apparatus to:

receive two dimensional ("2D") projection images of a prepared tooth generated from the 3D scan data;

generate a latent vector based on the 2D projection images; and generate coordinates of points forming a 3D prosthesis for the prepared tooth based on the latent vector, wherein generating the latent vector and generating the coordinates comprise executing a trained generative adversarial network that includes an image encoder and a mesh decoder, and wherein a prosthesis answer data used for training a generative adversarial network is generated by converting a first answer data corresponding to the prepared tooth into a second answer data having fixed connections using a deformable registration.

18. A non-transitory computer-readable storage medium having stored thereon program instructions, the program instructions executable by at least one hardware processor to:

extract prep information of a prepared tooth from a three dimensional ("3D") scan data;

generate a two dimensional ("2D") projection images by projecting the 3D scan data based on the prep information;

generate a 3D prosthesis based on the 2D projection images using a generative adversarial network including a 2D encoder and a 3D decoder; and generate a prosthesis answer data used for training the generative adversarial network, by converting a first answer data corresponding to the prepared tooth into a second answer data having fixed connections using a deformable registration.

* * * * *